(12) United States Patent
Yotsunaga et al.

(10) Patent No.: US 9,981,634 B2
(45) Date of Patent: May 29, 2018

(54) VEHICLE WINDSHIELD WIPER ASSEMBLY

(71) Applicant: Nissan North America, Inc., Franklin, TN (US)

(72) Inventors: Yasuo Yotsunaga, Kanagawa (JP); Kyle Happy, Walled Lake, MI (US); Kathryn Templeton, Bingham Farms, MI (US)

(73) Assignee: Nissan North America, Inc., Franklin, TN (US)

( * ) Notice: Subject to any disclaimer, the term of this patent is extended or adjusted under 35 U.S.C. 154(b) by 226 days.

(21) Appl. No.: 14/974,639

(22) Filed: Dec. 18, 2015

(65) Prior Publication Data

US 2017/0174184 A1 Jun. 22, 2017

(51) Int. Cl.
*B60S 1/06* (2006.01)
*B60S 1/34* (2006.01)
*B60S 1/04* (2006.01)

(52) U.S. Cl.
CPC ............. *B60S 1/3493* (2013.01); *B60S 1/043* (2013.01); *B60S 1/0463* (2013.01); *B60S 1/349* (2013.01); *B60S 1/3479* (2013.01)

(58) Field of Classification Search
CPC ...... B60S 1/043; B60S 1/0433; B60S 1/0436; B60S 1/0438; B60S 1/0441; B60S 1/0463; B60S 1/0458; B60S 1/3443; B60S 1/3479; B60S 1/3493; B60S 1/349
USPC ...... 15/250.3, 250.14; 296/192, 96.15, 96.17
See application file for complete search history.

(56) References Cited

U.S. PATENT DOCUMENTS

2004/0034959 A1* 2/2004 Nakamura ............ B60S 1/0425
   15/250.31
2013/0014339 A1 1/2013 Templeton et al.

* cited by examiner

Primary Examiner — Gary Graham (57) ABSTRACT

A support panel adjacent to the windshield opening has an upper surface and a lower surface with a first shaft opening. A wiper drive mechanism is supported to the vehicle body structure and extends along the lower surface of the support panel. The wiper drive mechanism includes a shaft housing and a wiper shaft pivotally supported within the shaft housing. A water diverting panel at least partially covers the wiper drive mechanism and is attached thereto and has a cylindrically shaped portion extending upward therefrom. The cylindrically shaped portion defines a second shaft opening with the shaft housing and wiper shaft extending upward through the second shaft opening and further extending upward through the first shaft opening. A filter member is mounted to the cylindrically shaped portion above the water diverting panel and below the support panel encircling the shaft housing.

12 Claims, 6 Drawing Sheets

VEHICLE WINDSHIELD WIPER ASSEMBLY

BACKGROUND

Field of the Invention

The present invention generally relates to a vehicle windshield wiper assembly. More specifically, the present invention relates to a vehicle windshield wiper assembly that includes a filter member that encircles a shaft support portion of a windshield wiper arm that allows the flow of water therethrough, but restricts debris from flowing therethrough.

Background Information

The cowl area of a vehicle at the base of a windshield of the vehicle typically includes an air intake vent that provides fresh air into an air intake box, which in turn provides the fresh air into the passenger compartment of the vehicle. A windshield wiper assembly is often installed to structure above the air intake box. Due to its location at the base of a windshield, water can enter the air intake box. However, the air intake box typically includes a drain allowing such water to drain out of the air intake box.

SUMMARY

One object of the present disclosure is to limit or prevent the ingress of debris into an area above an air intake box of a vehicle.

In view of the state of the known technology, one aspect of the present disclosure, is to provide a vehicle windshield wiper assembly with a vehicle body structure, a wiper drive mechanism, a water diverting panel and a filter member. The vehicle body structure defines a windshield opening and includes a support panel adjacent to the windshield opening. The support panel has an upper surface and a lower surface with a first shaft opening extending from the upper surface to the lower surface. The wiper drive mechanism is supported to the vehicle body structure and extends along the lower surface of the support panel. The wiper drive mechanism includes a shaft housing and a wiper shaft pivotally supported within the shaft housing. The water diverting panel at least partially covers the wiper drive mechanism and is attached thereto. The water diverting panel has a cylindrically shaped portion extending upward therefrom. The cylindrically shaped portion defines a second shaft opening with the shaft housing and wiper shaft extending upward through the second shaft opening and further extending upward through the first shaft opening. The filter member is mounted to the cylindrically shaped portion of the shaft housing above the water diverting panel and below the support panel. The filter member encircles the shaft housing and is shaped and dimensioned to allow flow of water from the first shaft opening therethrough, and restrict flow of debris from the first shaft opening therethrough.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
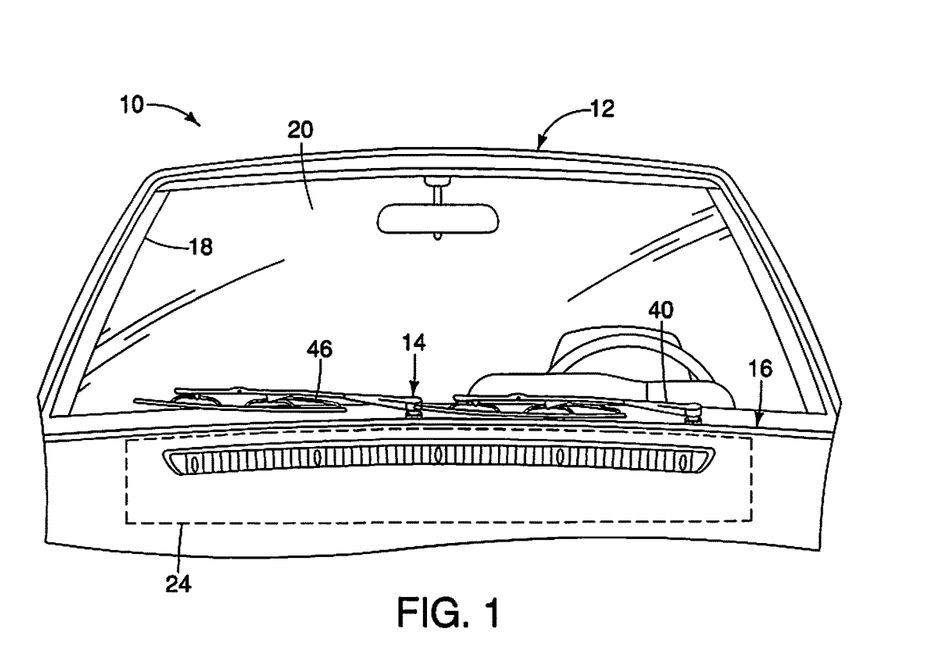
FIG. 1 is a front view of a vehicle showing a windscreen and a cowl area beneath the windscreen, the cowl area including a wiper drive mechanism in accordance with a first embodiment.

Referring initially to FIG. 1, a vehicle 10 that includes a vehicle body structure 12 having a wiper drive mechanism 14 is illustrated in accordance with a first embodiment.

The vehicle body structure 12 includes a cowl area 16 located adjacent to a windshield opening 18 having a windscreen 20. As shown in FIG. 1, within the vehicle body structure 12 beneath the cowl area 16 and the wiper drive mechanism 14, there is an air intake box 24 that is part of an air conditioning system (not shown). The air intake box 24 is configured to draw fresh air from outside the vehicle 10 and direct the fresh air into the passenger compartment of the vehicle 10 in a conventional manner. Due to its location, the air intake box 24 typically receives rain water and is provided with a drain (not shown) such that water can drain out of the air intake box 24 in a conventional manner. Since air intake boxes and air conditioning systems of vehicles are convention structures, further description is omitted for the sake of brevity.

Figure 2:
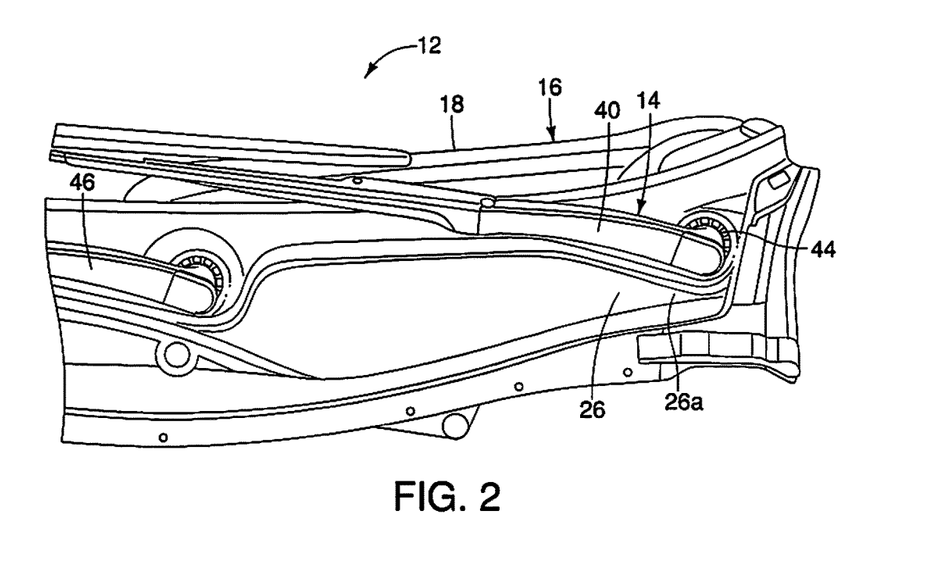
FIG. 2 is a perspective view of the cowl area of the vehicle showing a support panel and elements of the wiper drive mechanism including a filter member in accordance with the first embodiment.

As shown in FIG. 2, within area of the cowl area 16, the vehicle body structure 12 includes a support panel 26 that is located adjacent to the windshield opening 18. The support panel 26 includes an upper surface 26a (FIGS. 2 and 3), and a lower surface 26b (FIGS. 6 and 7) with a first shaft opening 26c (FIG. 7 only) extending from the upper surface 26a to the lower surface 26b.

Figure 4:
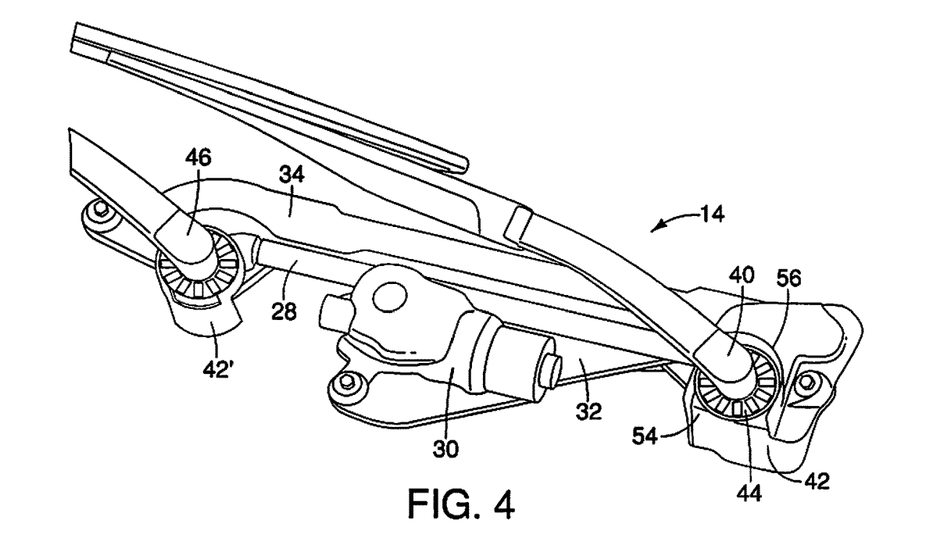
FIG. 4 is a perspective view of the wiper drive mechanism shown removed from the vehicle revealing a water diverting panel and the filter member in accordance with the first embodiment.

A description of the wiper drive mechanism 14 is now provided with specific reference to FIG. 4, which shows the wiper drive mechanism 14 removed from the vehicle body structure 12. The wiper drive mechanism 14 includes a base bracket 28, a motor 30, linkage members 32 and 34, a first shaft housing 36 (FIG. 7), a first wiper shaft 38 (FIG. 7), a first wiper arm 40, a water diverting panel 42 and a filter member 44. The wiper shaft drive mechanism 14 also includes a second wiper arm 46 that is supported on the wiper shaft mechanism 14 via a second shaft housing (not shown) and a second wiper shaft (not shown) that are essentially structurally the same as the first shaft housing 36 and the first wiper shaft 38. A second water diverting panel 42' is located beneath the second wiper arm 46 and serves the same purpose as the water diverting panel 42. The description of the water diverting panel 42 (provided below) applies equally to the second water diverting panel 42'. Therefore, further description of the second water diverting panel 42' is omitted for the sake of brevity.

The motor 30 and the first shaft housing 36 are rigidly connected to the base bracket 28 in a conventional manner. The base bracket 28 of the wiper drive mechanism 14 is fixedly attached to the vehicle body structure 12 at any of a variety of locations. For example, the wiper drive mechanism 14 can be fastened to the support panel 26, and/or other panels (not shown) of the vehicle body structure 12. Since attachment structures of wiper drive mechanisms are conventional vehicle features, further description is omitted for the sake of brevity.

Figure 6:
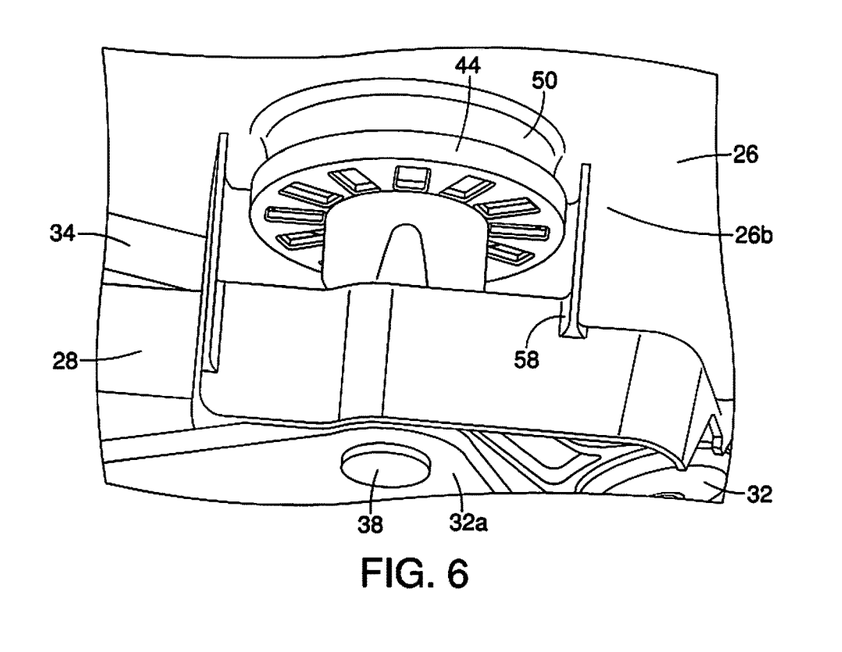
FIG. 6 is a perspective view of a portion of the cowl area and the wiper drive mechanism looking upward at the support panel, the water diverting panel and the filter member in accordance with the first embodiment.

As shown in FIG. 4, the linkage member 32 connects the motor 30 to the first wiper arm 40 in a conventional manner such that operation of the motor 30 causes pivoting movement of the first wiper arm 40. Specifically, the linkage member 32 is pivotally attached to a lever plate 32a that is shown in FIG. 6. As is also shown in FIG. 6, the first wiper shaft 38 extends through the lever plate 32a and is fixedly attached thereto for pivoting movement therewith. The linkage member 34 connects the lever plate 32a with the second wiper arm 46 in order to move the second wiper arm 46 in synchronously along the windscreen 20 with the first wiper arm 40 in order to wipe rain water therefrom in a conventional manner. Since the structures of wiper drive mechanisms are conventional vehicle features, further description is omitted for the sake of brevity.

Figure 3:
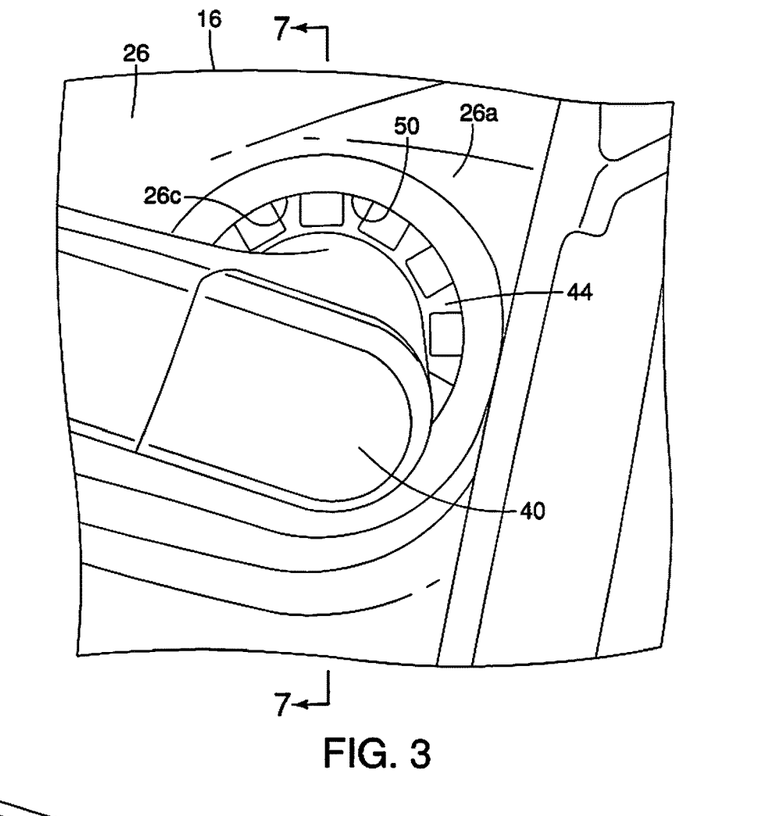
FIG. 3 is a perspective view of a portion of the cowl area showing a portion of the support panel and one end of one of the wiper arms of the wiper drive mechanism and the filter member in accordance with the first embodiment.
Figure 5:
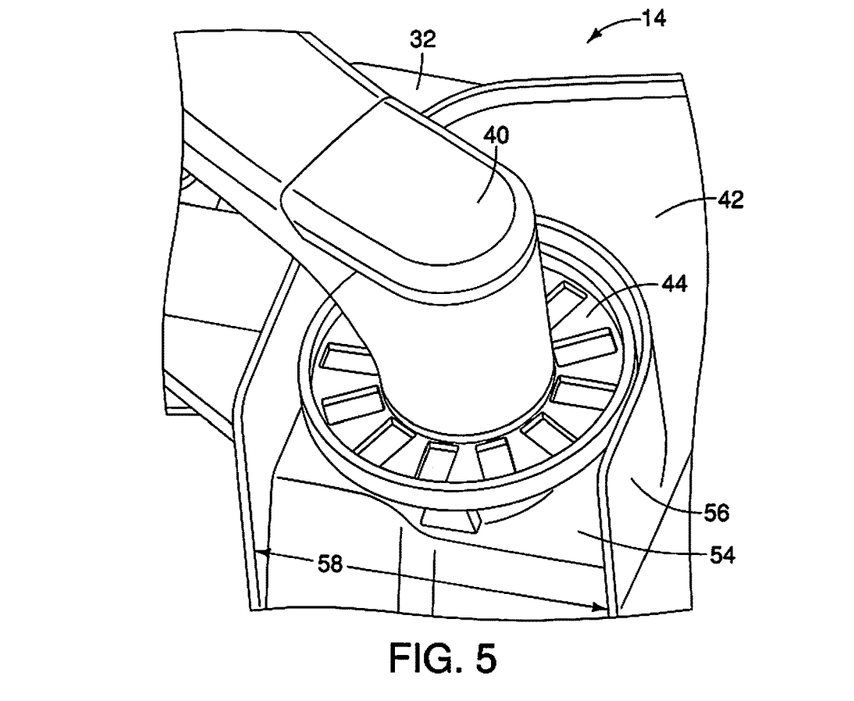
FIG. 5 is a perspective view of a portion of the wiper drive mechanism showing details of the water diverting panel and the filter member in accordance with the first embodiment.
Figure 7:
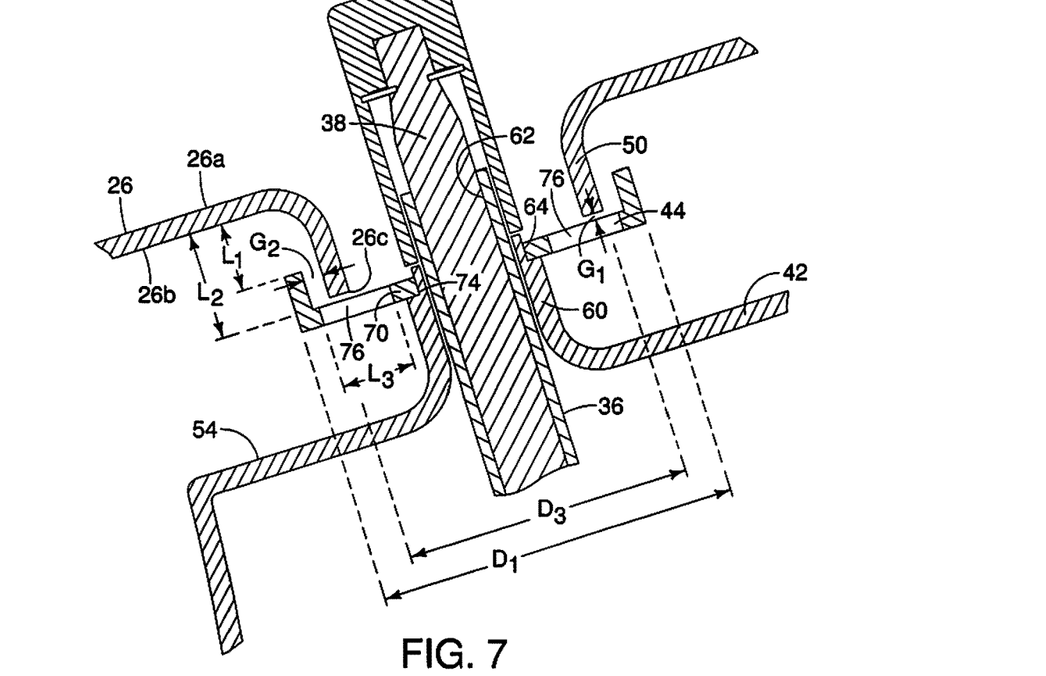
FIG. 7 is a cross-sectional view of a portion of the cowl area taken along the line 7-7 in FIG. 3, showing the support panel, the water diverting panel, the filter member, and a first shaft housing and a first wiper shaft of the wiper drive mechanism in accordance with the first embodiment.

As shown in FIG. 6, the wiper drive mechanism 14 extends along the lower surface 26b of the support panel 26. As shown in FIGS. 6 and 7, the support panel 26 includes a cylindrically shaped projection 50 that extends downward from the lower surface 26b of the support panel 26. Further, the first shaft opening 26c is defined at a bottom end of the cylindrically shaped protrusion 50. As shown in FIGS. 2 and 3, the inner diameter of the cylindrically shaped protrusion 50 is sufficiently large so as to reveal the filter member 44. In FIGS. 4 and 5, the support panel 26 is removed revealing the filter member 44 and the water diverting panel 42.

The water diverting panel 42 is a separate element that is installed to the base bracket 28. The water diverting panel 42 is a protective element that is dimensioned to cover the lever plate 32a and pivot pin connections between the lever plate 32a and the linkage members 32 and 34. Specifically, the water diverting panel 42 is shaped and dimensioned to divert water falling through the first shaft opening 26c of the support panel 26 away from the lever plate 32a and other elements of the wiper drive mechanism 14, and forward away from the windscreen 20, and/or into the air intake box 24.

As shown in FIG. 7, the water diverting panel 42 is pitched or inclined forward relative to the vehicle 10. In other words, the left side of FIG. 7 is forward of the right side of FIG. 7 relative to a longitudinal direction of the vehicle 10. As shown in FIGS. 4, 5 and 6, the water diverting panel 42 includes an inclined surface 54 and an upwardly extending wall 56 that partially encircles the inclined surface 54. The upwardly extending wall 56 defines a gap 58 along a lowest edge of the inclined surface 54 such that any water that reaches the inclined surface 54 can run off through the gap 58.

As shown in FIGS. 6 and 7, the water diverting panel 42 also includes a cylindrically shaped portion 60 that extends upward from the inclined surface 54. The cylindrically shaped portion 60 defines a second shaft opening 62. As shown in FIG. 7, the first shaft housing 36 and the first wiper shaft 38 extend upward through the second shaft opening 62 and further extend upward through the first shaft opening 26c of the support panel 26. The first wiper arm 40 is fixed to an upper end of the first wiper shaft 38. The upper end of the cylindrically shaped portion 60 of the water diverting panel 42 includes an annular recess 64. As shown in FIG. 7, the filter member 44 is installed to the cylindrically shaped portion 60 and is specifically fitted to the annular recess 64.

Hence, the filter member 44 is located above the water diverting panel 42 and below the support panel 26. The filter member 44 encircling the first shaft housing 36 and is shaped and dimensioned to allow flow of water from the first shaft opening 26c to the inclined surface 54 but restrict flow of debris from the first shaft opening 26c to the inclined surface 54.

The filter member 44 will now be described with specific reference to FIGS. 8, 9 and 10. The filter member 44 includes a main portion 70 and an outer ring portion 72 (an outer annular projection). The main portion 70 has an overall disk-like shape that defines a central opening 74. The main portion 70 has an upper surface 70a (FIG. 8) and a lower surface 70b (FIG. 9). The central opening 74 defines an inner annular perimeter of the filter member 44 and the outer ring portion 72 defines an outer annular perimeter. The outer ring portion 72 (the outer annular perimeter) surrounds the main portion 70 and defines a first diameter $D_1$ and the central opening 74 defines a second diameter $D_2$ that is smaller than the first diameter $D_1$. The outer ring portion 72 has an overall height H measured perpendicular to the main portion 70. The main portion 70 is formed with a plurality of apertures 76 defined between the outer ring portion 72 and the central opening 74. The apertures 76 extend from the upper surface 70a to the lower surface 70b. The apertures 76 are rectangular in the depicted first embodiment. However, it should be understood from the drawings and the description herein that the apertures 76 can have any of a variety of shapes that prevent debris from passing therethrough, but allow water to flow therethrough.

In the first embodiment, the filter member 44 (including the main portion 70 and the outer ring portion 72) are unitarily formed as a single monolithic element. However, it should be understood from the drawings and the description herein that the filter member 44 can be constructed and or molded of several elements fixed to one another.

Figure 8:
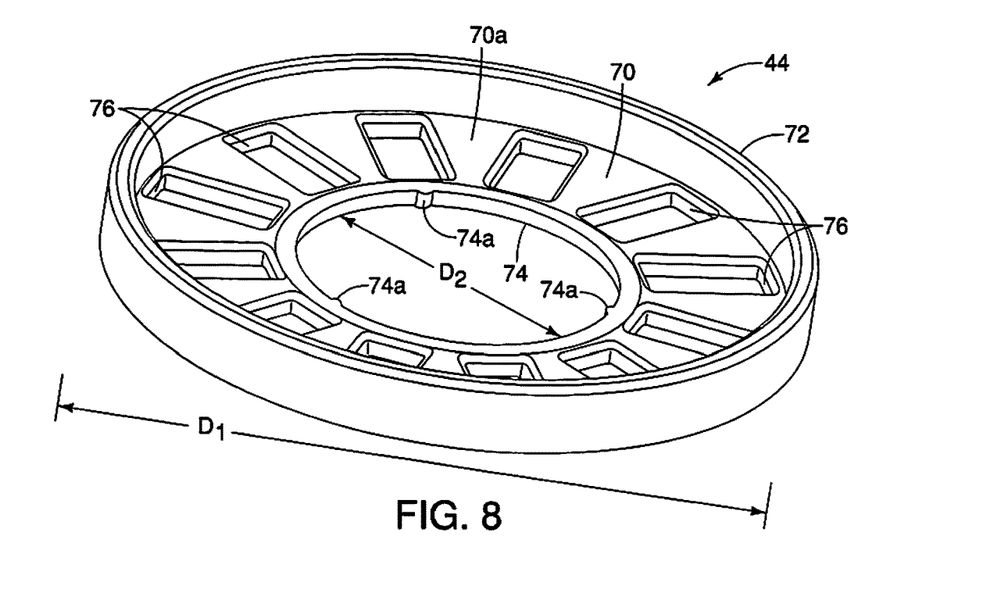
FIG. 8 is a perspective view of the filter member removed from the wiper drive mechanism showing an upper surface of a main portion and an outer ring portion extending upward from the main portion in accordance with the first embodiment.
Figure 9:
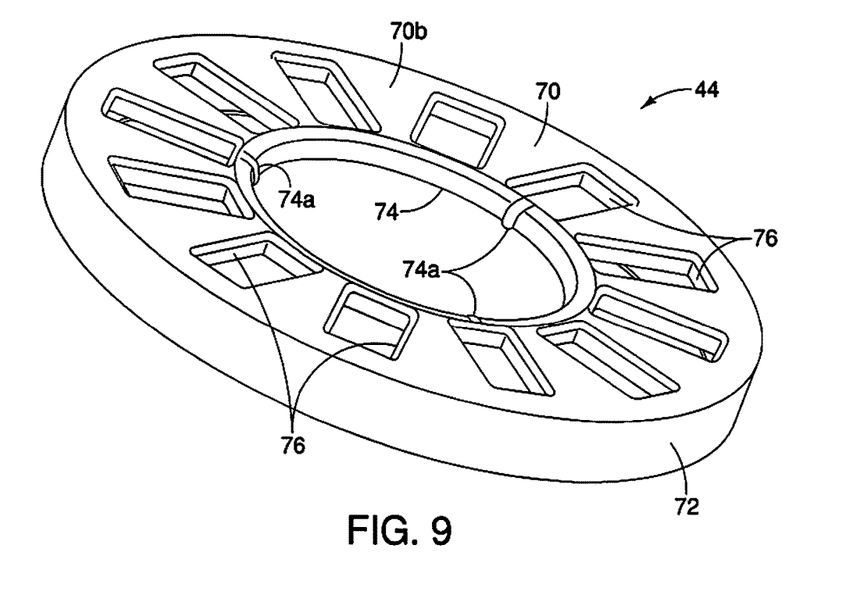
FIG. 9 is another perspective view of the filter member showing a lower surface of the main portion and the outer ring portion in accordance with the first embodiment.
Figure 10:
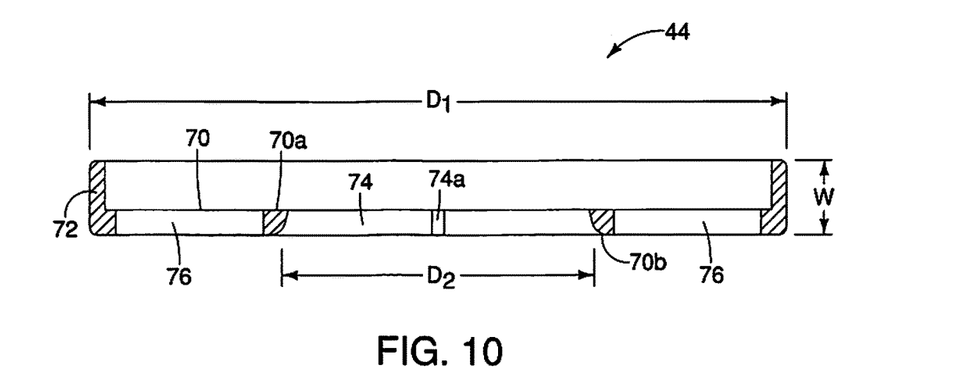
FIG. 10 is a side view of the filter member in accordance with the first embodiment.

As shown in FIGS. 8-10, the inner annular perimeter of the central opening 74 includes three small projections 74a. The three small projections 74a contact the annular recess 64 of the cylindrically shaped portion 60 of the water diverting panel 42, as shown in FIG. 7. The main portion 70 of the filter member 44 is planar and the outer ring portion 72 extends upward perpendicular to the main portion 70. As shown in FIG. 7, the upper surface 70a of the main portion 70 is a first distance $L_1$ away from the lower surface 26b of the support panel 26. An upper distal edge of the outer ring portion 72 is a second distance $L_2$ away from the lower surface 26b of the support panel 26, with the first distance $L_1$ being greater than the second distance $L_2$. Further, the outer ring portion 72 extends upward from the main portion 70 of the filter member 40 such that the upper portion of the outer ring portion 72 encircles the bottom end of the cylindrically shaped projection 50 of the support panel 26.

As is also shown in FIG. 7, a bottom end of the cylindrically shaped projection 50 defines a third diameter $D_3$. The first diameter $D_1$ of the filter member 44 is greater than the third diameter $D_3$. The bottom end of the cylindrically shaped projection 50 is spaced apart from the main portion 70 of the filter member 44 defining a gap $G_1$ therebetween. The gap $G_1$ is smaller than a length $L_3$ of each of the plurality of apertures 76 in the main portion 70, as measured in a radial direction of the filter member 44. Further, a gap $G_2$ is defined between an inner annular surface of the outer ring portion 72 of the filter member 44 and the outer surface of the cylindrically shaped projection 50 of the support panel 26.

The size of the apertures 76 in the filter member 44 and the size of the gaps $G_1$ and $G_2$ is such that water flowing down through the first shaft opening 26c of the support panel 26 can freely flow therethrough. However, debris, such as leaves, seeds or other undesirable debris is prevented from flowing past the filter member 44, thereby preventing, or at the very least, limiting such debris from reaching the water diverting panel 42 and entering the air intake box 24.

It should be understood from the drawings and the description herein that there are two filter members 44. The first of the two filter members 44 is located as described above on the water diverting panel 42. The other filter member 44 is installed to the second water diverting panel 42' beneath the second wiper arm 46 providing debris restricting purpose as described above.

Second Embodiment

Figure 11:
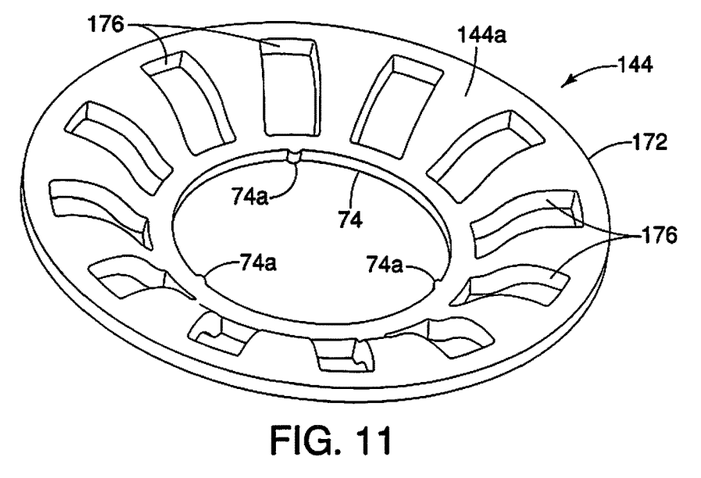
FIG. 11 is a perspective view of a filter member removed from the wiper drive mechanism showing an upper surface thereof in accordance with a second embodiment.
Figure 12:
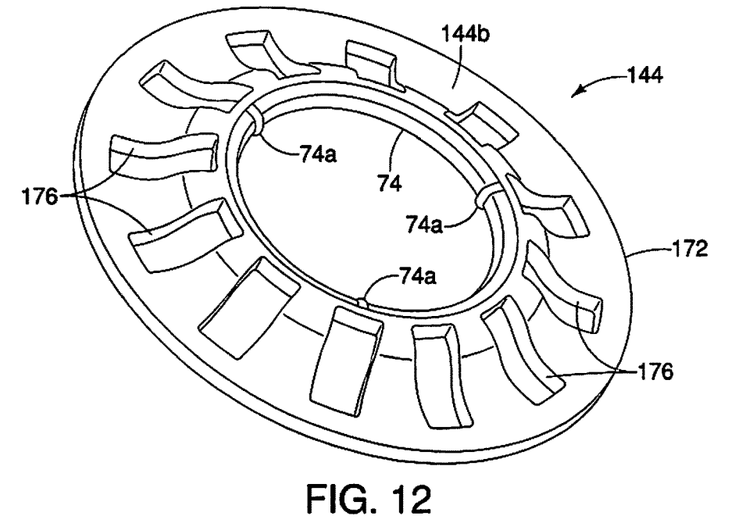
FIG. 12 is another perspective view of the filter member showing a lower surface thereof in accordance with the second embodiment.
Figure 13:
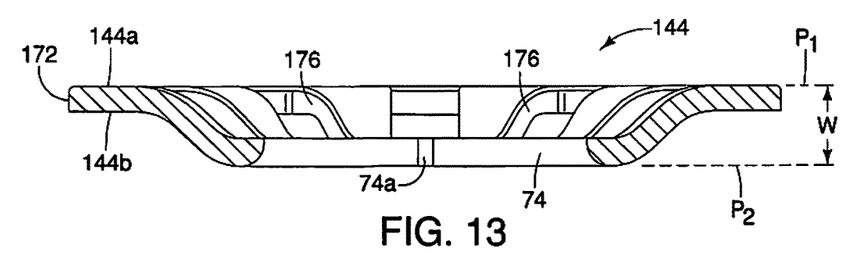
FIG. 13 is a side view of the filter member in accordance with the second embodiment.

Referring now to FIGS. 11-13, a filter member 144 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the filter member 144 is basically a concave disk member (as viewed from above in FIG. 11). More specifically, the filter member 144 has an upper surface 144a and a lower surface 144b. The upper surface 144a is concaved (FIG. 11) and the lower surface is convex (FIG. 12).

The filter member 144 defines an outer annular perimeter 172 and the central opening 74, as described above in the first embodiment. The central opening 74 includes the projections 74a for attachment to the water diverting panel 42 in a manner consistent with the attachment of the filter member 44 of the first embodiment. Further, the filter member includes apertures 176 dimensioned similar to the apertures 76 of the first embodiment.

At the outer annular perimeter 172, the upper surface 144a defines and/or coincides with a first plane $P_1$. At the central opening 74, the lower surface 144b defines and/or coincides with a second plane $P_2$. The first plane $P_1$ and the second plane $P_2$ are parallel to one another. The distance between the first plane $P_1$ and the second plane $P_2$ is preferably equal to the height H defined by the outer ring portion 72 of the filter member 44 of the first embodiment.

Hence, the filter member 144 can be used in the same manner as the filter member 44 of the first embodiment.

The vehicle body structure elements and the wiper drive mechanism are conventional components that are well known in the art. Since such structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle windshield wiper assembly. Accordingly, these terms, as utilized to describe the present invention should be interpreted relative to a vehicle equipped with the vehicle windshield wiper assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle windshield wiper assembly, comprising
a vehicle body structure defining a windshield opening and including a support panel adjacent to the windshield opening, the support panel having an upper surface and a lower surface with a first shaft opening extending from the upper surface to the lower surface;
a wiper drive mechanism supported to the vehicle body structure and extending along the lower surface of the support panel, the wiper drive mechanism including a shaft housing and a wiper shaft pivotally supported within the shaft housing;
a water diverting panel at least partially covering the wiper drive mechanism and being attached thereto, the water diverting panel having a cylindrically shaped portion extending upward therefrom, the cylindrically shaped portion defining a second shaft opening with the shaft housing and wiper shaft extending upward through the second shaft opening and further extending upward through the first shaft opening; and
a filter member mounted to an outer surface of the cylindrically shaped portion of the water diverting panel and below the support panel, the filter member encircling the shaft housing and being shaped and dimensioned to allow flow of water from the first shaft opening therethrough and restrict flow of debris from the first shaft opening therethrough.

2. The vehicle windshield wiper assembly according to claim 1, wherein
the filter member has a main portion having a disk-shape, an outer annular perimeter surrounding the main portion and defining a first diameter and an inner annular perimeter defining a central opening defining a second diameter smaller that the first diameter, the main portion having a plurality of apertures defined between the outer annular perimeter and the inner annular perimeter.

3. The vehicle windshield wiper assembly according to claim 2, wherein
the inner annular perimeter of the filter member contacts and surrounds the cylindrically shaped portion of the water diverting panel retaining the filter member thereto.

4. The vehicle windshield wiper assembly according to claim 2, wherein
the main portion of the filter member is planar and the outer annular perimeter extends upward perpendicular to the main portion such that an upper surface of the main portion is a first distance away from the lower surface of the support panel and a distal edge of the outer annular perimeter is a second distance away from the lower surface of the support panel, the first distance being greater than the second distance.

5. The vehicle windshield wiper assembly according to claim 2, wherein
the outer annular perimeter extends along a first plane and the inner annular perimeter extends along a second plane that is parallel to the first plane, the first plane being closer the lower surface of the support panel than the second plane.

6. The vehicle windshield wiper assembly according to claim 2, wherein
the support panel includes a cylindrically shaped projection that extends downward from the lower surface of the support panel with the first shaft opening being defined at a bottom end of the cylindrically shaped protrusion.

7. The vehicle windshield wiper assembly according to claim 6, wherein
the cylindrically shaped projection has an outer surface adjacent to the first shaft opening that defines a third diameter, and
the first diameter of the outer annular perimeter is greater than the third diameter.

8. The vehicle windshield wiper assembly according to claim 7, wherein
the outer annular perimeter extends upward from the main portion of the filter member such that the outer annular perimeter encircles the bottom end of the cylindrically shaped projection.

9. The vehicle windshield wiper assembly according to claim 8, wherein
the outer annular perimeter and the bottom end of the cylindrically shaped projection are spaced apart from one another in defining a gap therebetween, the gap being smaller that a length of each of the plurality of apertures in the main portion as measured in a radial direction of the filter member.

10. The vehicle windshield wiper assembly according to claim 7, wherein
the main portion of the filter member is planar and the outer annular perimeter extends upward perpendicular to the main portion such that an upper surface of the main portion is a first distance away from the lower surface of the support panel and a distal edge of the outer annular perimeter is a second distance away from the lower surface of the support panel, the first distance being greater than the second distance.

11. The vehicle windshield wiper assembly according to claim 7, wherein
the outer annular perimeter extends along a first plane and the inner annular perimeter extends along a second plane that is parallel to the first plane, the first plane being closer the lower surface of the support panel than the second plane.

12. The vehicle windshield wiper assembly according to claim 11, wherein
the outer annular perimeter is spaced apart from the lower surface of the support pane by a first distance, and
the bottom end of the cylindrically shaped projection spaced apart from the lower surface of the support panel by a second distance greater than the first distance.

* * * * *